(12) United States Patent
Hull et al.

(10) Patent No.: US 7,950,563 B2
(45) Date of Patent: May 31, 2011

(54) APPARATUS AND METHOD FOR BEARING A TOOL AGAINST A WORKPIECE

(75) Inventors: John R. Hull, Sammamish, WA (US); John A. Mittleider, Kent, WA (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 12/164,466

(22) Filed: Jun. 30, 2008

(65) Prior Publication Data

US 2009/0321098 A1    Dec. 31, 2009

(51) Int. Cl.
*B23K 20/12* (2006.01)
(52) U.S. Cl. ........ 228/2.1; 228/2.3; 228/112.1; 228/113
(58) Field of Classification Search ............... 228/2.1, 228/112.1, 2.3, 113; 73/49, 213
See application file for complete search history.

(56) References Cited

U.S. PATENT DOCUMENTS

| | | | |
|---|---|---|---|
| 3,704,821 A * | 12/1972 | Loyd et al. | 228/2.3 |
| 5,387,451 A * | 2/1995 | Miller | 428/66.2 |
| 6,779,709 B2 * | 8/2004 | Stotler et al. | 228/113 |
| 6,793,057 B1 * | 9/2004 | Smith, Jr. | 192/70.14 |
| 7,735,712 B2 * | 6/2010 | Dzialas et al. | 228/112.1 |
| 2003/0201306 A1 * | 10/2003 | McTernan et al. | 228/112.1 |

FOREIGN PATENT DOCUMENTS

JP    07001164 A  *  1/1995

* cited by examiner

*Primary Examiner* — Jessica L Ward
*Assistant Examiner* — Devang R Patel
(74) *Attorney, Agent, or Firm* — Law Office of Donald D. Mondul

(57) ABSTRACT

An apparatus for bearing a tool against a workpiece includes: (a) a pneumatically driven motor unit rotating a drive shaft substantially about a longitudinal drive axis; (b) a process shaft coupled with the drive shaft for rotating the tool substantially about a longitudinal process axis; (c) a flywheel coupled with one shaft of the drive shaft and the process shaft; and (d) at least one urging unit coupled with at least one of the motor unit and the process shaft. The urging unit moves the tool with respect to the workpiece. The flywheel and the one shaft impart inertial rotational energy to the tool after the pneumatic motor achieves a predetermined rotational speed.

17 Claims, 5 Drawing Sheets

APPARATUS AND METHOD FOR BEARING A TOOL AGAINST A WORKPIECE

The invention was made with Government support under Contract Number FA8611-05-C-2850 awarded by the Air Force. The Government has certain rights in this invention.

FIELD

The present disclosure is directed to tool drivers, and especially to pneumatically driven tool drivers for rotationally driving a tool against a workpiece.

BACKGROUND

Bringing rotational tools to bear on a workpiece may be a known technique for working materials. One such process may involve friction welding, which may be described as a class of solid-state welding processes that generate heat through mechanical friction generated by relative movement of a workpiece and a tool or other component. Axial force may be employed to increase pressure between the workpiece and the tool to enhance generation of friction heat between the workpiece and the tool.

Another example of using friction between a workpiece and a tool to effect a welding process may be inertial plug welding. Inertial plug welding may involve pushing and rotating a plug against a workpiece to generate friction. The plug may be expended during the process as a welding material used to effect the welding process.

Existing apparatuses for effecting welding such as inertial plug welding may use hydraulic motors and hydraulic rams to provide torque and pressure to a process head holding a plug. Such existing apparatuses may be too heavy to be carried on an affordable robot arm. Among other things, the hydraulic hoses and hydraulic fluid required by the existing apparatuses may make the apparatus heavy. A robot arm may have to be very massive and expensive to properly support such an existing hydraulic-based apparatus.

There is a need for an apparatus and method for bearing a tool against a workpiece that can effect friction welding on a mobile platform such as a lightweight robot arm.

There is a need for an apparatus and method for bearing a tool against a workpiece that can effect inertial plug welding on a mobile platform such as a lightweight robot arm.

SUMMARY

An apparatus for bearing a tool against a workpiece includes: (a) a pneumatically driven motor unit rotating a drive shaft substantially about a longitudinal drive axis; (b) a process shaft coupled with the drive shaft for rotating the tool substantially about a longitudinal process axis; (c) a flywheel coupled with one shaft of the drive shaft and the process shaft; and (d) at least one urging unit coupled with at least one of the motor unit and the process shaft. The urging unit moves the tool with respect to the workpiece. The flywheel and the one shaft impart inertial rotational energy to the tool after the pneumatic motor achieves a predetermined rotational speed.

A method for bearing a tool against a workpiece includes: (a) in no particular order: (1) providing a pneumatically driven motor unit presenting a drive shaft; (2) providing a process shaft coupled with the drive shaft and coupled with the tool; (3) providing a flywheel coupled with one shaft of the drive shaft and the process shaft; and (4) providing at least one urging unit coupled with at least one of the motor unit and the process shaft; (b) operating the motor unit to rotate the drive shaft substantially about a longitudinal axis; (c) operating the flywheel and the one shaft to impart inertial rotational energy to the tool after the pneumatic motor achieves a predetermined rotational speed; and (d) operating the at least one urging unit to effect moving the tool with respect to the workpiece.

It is, therefore, a feature of the present disclosure to present an apparatus and method for bearing a tool against a workpiece that can effect friction welding on a mobile platform such as a lightweight robot arm.

It is a further feature of the present disclosure to present an apparatus and method for bearing a tool against a workpiece that can effect inertial plug welding on a mobile platform such as a lightweight robot arm.

Further features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

The apparatus may include a pneumatic motor, a flywheel, a process shaft, a pneumatic ram urging unit, mechanical bearings, and mounting hardware. A second embodiment may include one or more magnetic gears to facilitate mounting the flywheel in a vacuum chamber for nearly friction-free running. A vacuum chamber and vacuum pump may be provided to equip a vacuum chamber for the flywheel. The pneumatic ram may include one or more power cylinders of the sort that may use mechanical leverage to multiply the force of the air actuation during the last quarter to half inch of ram travel. Such a power cylinder may permit making the ram lighter as compared with a simple air cylinder.

Figure 1:
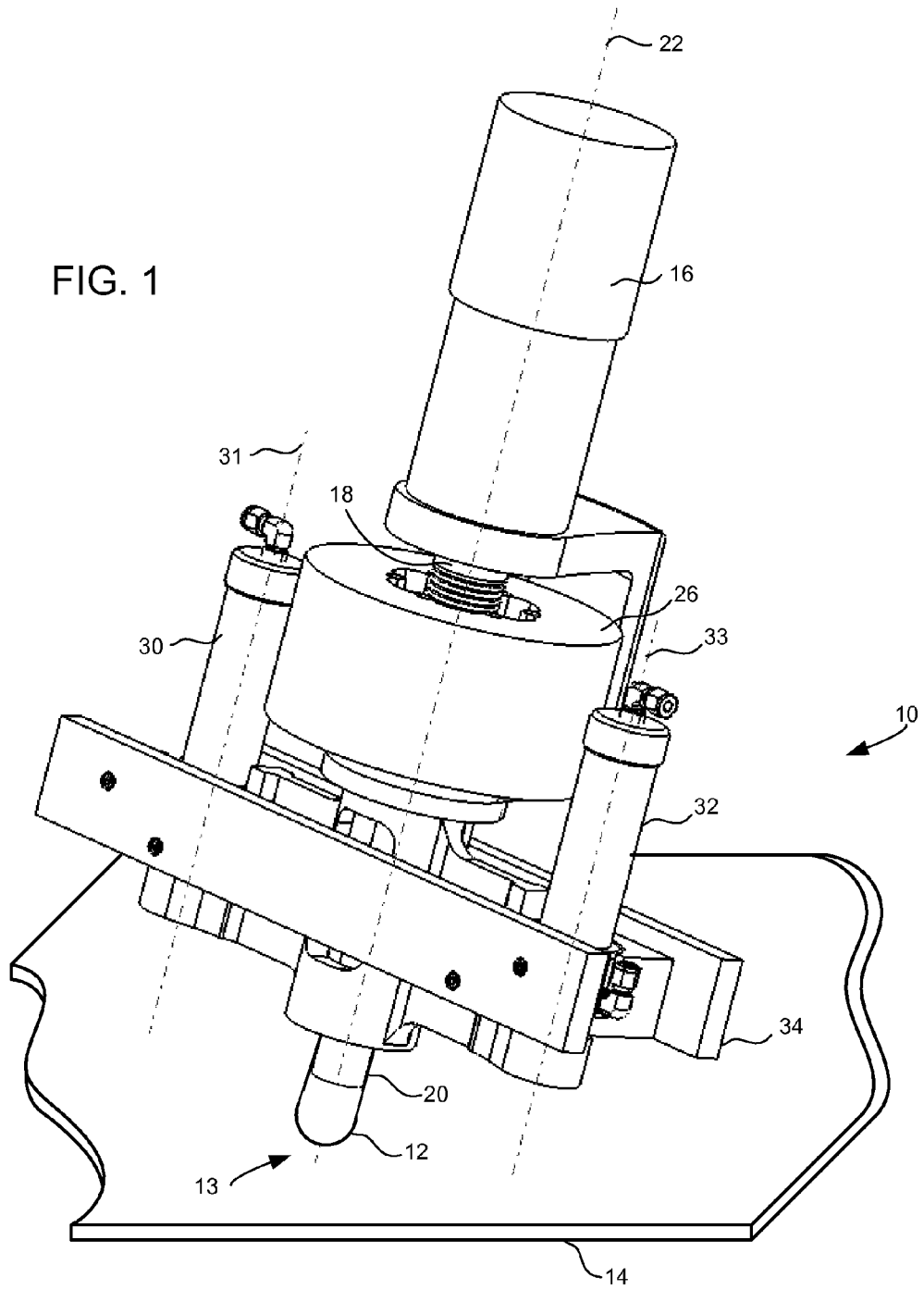
FIG. 1 is a perspective illustration of an embodiment of the apparatus of the present disclosure.

FIG. 1 is a perspective illustration of an embodiment of the apparatus of the present disclosure. In FIG. 1, an apparatus 10 for bearing a tool 12 against a workpiece 14 may include a pneumatic motor unit 16. Pneumatic motor unit 16 may include a drive shaft (not visible in FIG. 1) coupled with a flexible coupler 18. Flexible coupler 18 may couple the drive shaft of pneumatic motor unit 16 with a process shaft 20, and process shaft 20 may be coupled with tool 12. Flexible coupler 18 may flexibly couple the drive shaft of pneumatic motor unit 16 and process shaft 20 generally aligned with a longitudinal axis 22 or may flexibly couple the drive shaft of pneumatic motor unit 16 and process shaft 20 generally aligned with respective separate but substantially parallel axes (not shown). Flexible coupler 18 does not effect alignment. Rather flexible coupler 18 transmits torque between two coupled shafts even if the two shafts are parallel but not coaxial or even if there is a misalignment in the parallelism of the two shafts. The drive shaft of pneumatic motor unit 16 and process shaft 20 may be embodied in one unitary shaft substantially symmetrically oriented with respect to longitudinal axis 22 without flexible shaft 18.

A flywheel 26 may be coupled with one or more of the drive shaft of pneumatic motor unit 16, flexible coupling 18 and process shaft 20. Preferably, flywheel 26 may impart inertial rotational energy to tool 12 after pneumatic motor unit 16 achieves a predetermined rotational speed. Urging units 30, 32 may move tool 12 toward and away from workpiece 14. Urging units 30, 32 may operate substantially along axes 31, 33 to urge tool 12 against workpiece 14 after motor unit 16 has achieved a predetermined rotational speed. Axes 31, 33 may be generally parallel with axis 22.

Apparatus 10 may include a base unit 34 for holding motor unit 16 including a drive shaft (not visible in FIG. 1), a flexible coupling 18 affixing the drive shaft of motor unit 16 with process shaft 20, flywheel 26 and urging units 30, 32 in a substantially unitary fixed orientation. Base unit 34 may contribute to urging units 30, 32 being able to move motor unit 16, drive shaft 18, process shaft 20 and flywheel 26 toward and away from workpiece 14 in effecting work on workpiece 14 by tool 12. Base unit 34 may be configured to facilitate mounting with a robot arm or other manufacturing fixture (not shown in FIG. 1; understood by those skilled in the art of automated manufacturing).

Pneumatic motor unit 16 may be coupled with flywheel 26 by a drive shaft included in motor unit 16 and shaft coupling 18. Motor unit 16 may accelerate flywheel 26 to a maximum speed attainable by motor unit 16 that maybe governed by air pressure provided to drive motor unit 16. Once flywheel 26 has attained the desired predetermined rotational speed, the urging units 30, 32 (preferably embodied in pneumatic ram units) push motor unit 16, flywheel 26 and process shaft 20 as a unit toward workpiece 14. Tool 12 may comprise, include or contain a plug to be welded at the end of process shaft 20 (not shown in detail in FIG. 1; understood by those skilled in the art of inertial plug welding). The inertia of flywheel 26 may provide sufficient energy to rotate the plug into workpiece 14 at a welding site 13 while urging units 30, 32 push the plug against workpiece 14. Once flywheel 26 comes to a stop, motor unit 16 may stall and urging units 30, 32 may continue to push against workpiece 14 for a period of time until the weld effected by the plug cools. A valve on the air inlet of motor unit 16 and a valve on the air outlet of motor unit 16 (not shown in FIG. 1; understood by those skilled in the art of pneumatic motors) may be closed to lock motor unit 16 in position. The process head (part of tool 12) may then release the welded plug. After the plug is released, urging units 30, 32 may raise tool 12 high enough to permit insertion of a new plug into the process head in tool 12. A robot arm (not shown in FIG. 1; understood by those skilled in the art of automated processing) may assist in raising apparatus 10 to provide a desired clearance. Air inlet valves and air outlet valves to motor unit 16 may then be opened to permit motor unit 16 to move so that flywheel 26 may again accelerate while the robot arm may position apparatus 10 for a next weld.

Flywheel 26 may provide rotary inertia to provide energy and torque to drive tool 12 in order to effect an inertial-plug welding process. Urging units 30, 32 may push the plug into workpiece 14 and may hold the plug there while a just-completed weld may cool. Configuring urging units 30, 32 as power cylinders may serve to lighten apparatus 10. Apparatus 10 may employ magnetic gears to minimize the weight of flywheel 26 and its supporting structure. Apparatus 10 may advantageously employ a light-weight air motor unit 16 for accelerating flywheel 26. Flywheel 26 may then provide substantially all of the torque energy needed on process shaft 20 for effecting a weld process.

In contrast, prior art friction welding apparatuses employ a hydraulic motor for providing most of energy required for welding, and a flywheel is employed for providing only a small portion of the energy required for a weld. Prior art friction welding apparatuses may also employ a hydraulic ram for urging a tool against a workpiece. Such hydraulic rams are generally heavier than pneumatic rams and may leak hydraulic or other fluid into a weld area or elsewhere on a workpiece. Apparatus 10 may advantageously employ air-driven motor unit 16 and pneumatic urging units 30, 32 to preclude leaks and to lighten apparatus 10 so that apparatus 10 may be employed on a robot arm or with other automated manufacturing equipment with a lesser requirement for accommodating equipment weight. Such lesser-weight accommodating robot arms or other manufacturing fixtures may be less expensive than similar equipment built to handle greater weight.

Flywheel 26 may be spun to higher rotational speeds if deployed in a vacuum. Deploying flywheel 26 in a vacuum may require coupling flywheel 26 with process shaft 20 using magnetic gears (not shown in detail in FIG. 1; understood by those skilled in the art of magnetic gear employment) to transmit torque through a wall of a vacuum chamber containing flywheel 26.

Flywheel 26 may be constructed in a lighter-weight embodiment in order to have flywheel 26 turn at a rotational rate faster than that used by a weld process. In such an embodiment, a magnetic gear may connect a shaft bearing flywheel 26 (not shown in FIG. 1) with process shaft 20. Other magnetic gearing may be provided to couple the shaft bearing flywheel 26 with drive shaft 18 to permit flywheel 26 to turn faster than the maximum speed of pneumatic motor unit 16.

Figure 2:
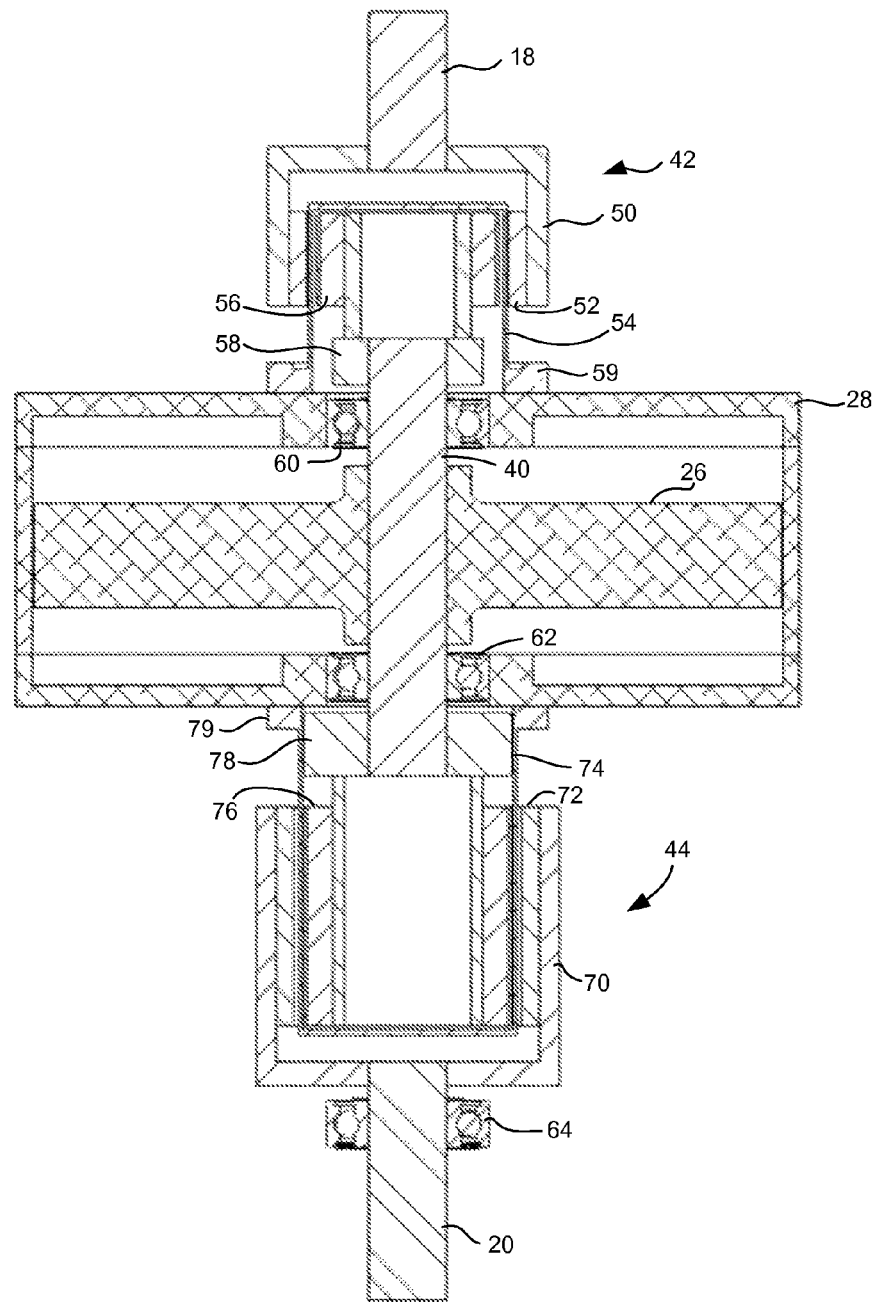
FIG. 2 is a section view of a flywheel assembly configured for use with the apparatus illustrated in FIG. 1.

FIG. 2 is a section view of a flywheel assembly configured for use with the apparatus illustrated in FIG. 1. In FIG. 2, a flywheel 26 may be contained within a sealed housing 28 and may be coupled with a flywheel shaft 40. Flywheel shaft 40 may be coupled with flexible coupling 18 by a magnetic gear coupling 42. In an alternate embodiment, flywheel shaft 40 may be coupled with the drive shaft of motor unit 16 via magnetic gear coupling 42

Flexible coupling 18 may permit attachment of flywheel shaft 40 with a drive shaft of a motor unit (not shown in FIG. 2; see motor unit 16, FIG. 1). Magnetic gear coupling 42 may include an outer housing 50 coupled with flexible coupling 18, outer magnetic gears 52 within outer housing 50, an inner housing 54 and inner magnetic gears 56 within inner housing 54. One or more of outer magnetic gears 52 and inner magnetic gears 56 may be embodied in permanent magnet structures. Magnetic gear coupling 42 may be coupled with flywheel shaft 40 by a coupling 58. Inner housing 54 may sealingly contain inner magnetic gears 56 and coupling 58 with a portion of flywheel shaft 40 in cooperation with sealed housing 28 and a sealing unit 59. Sealing unit 59 may be an integral portion of inner housing 54 or maybe embodied in a separate sealing unit.

Flywheel shaft 40 may be coupled with process shaft 20 by a magnetic gear coupling 44. Magnetic gear coupling 44 may include an outer housing 70 coupled with process shaft 20, outer magnetic gears 72 within outer housing 70, an inner housing 74 and inner magnetic gears 76 within inner housing 74. One or more of outer magnetic gears 72 and inner magnetic gears 76 may be embodied in permanent magnet structures. Magnetic gear coupling 44 may be coupled with flywheel shaft 40 by a coupling 78. Inner housing 74 may sealingly contain inner magnetic gears 76 and coupling 78 with a portion of flywheel shaft 40 in cooperation with sealed housing 28 and a sealing unit 79. Sealing unit 79 may be an integral portion of inner housing 74 or maybe embodied in a separate sealing unit.

Bearing units may support flywheel shaft 40 and process shaft, as indicated by representative bearing units 60, 62, 64. The drive shaft of a motor unit (not shown in FIG. 2; see motor unit 16, FIG. 1) may also be supported by bearings (not shown in FIG. 2; understood by those skilled in the art of rotating machinery design).

Using the structure illustrated in FIG. 2, flywheel 26 may be maintained in a vacuum within sealed housing 28, thereby permitting rotation without significant air resistance. Such airless operation may permit flywheel 26 to rotate at higher speeds than may be achieved in rotating flywheel 26 in an unevacuated environment, such as open air. Higher rotation speed may permit flywheel 26 to be configured in a lighter-mass unit for a given amount of stored energy than may be achievable by a slower rotating flywheel.

Figure 4:
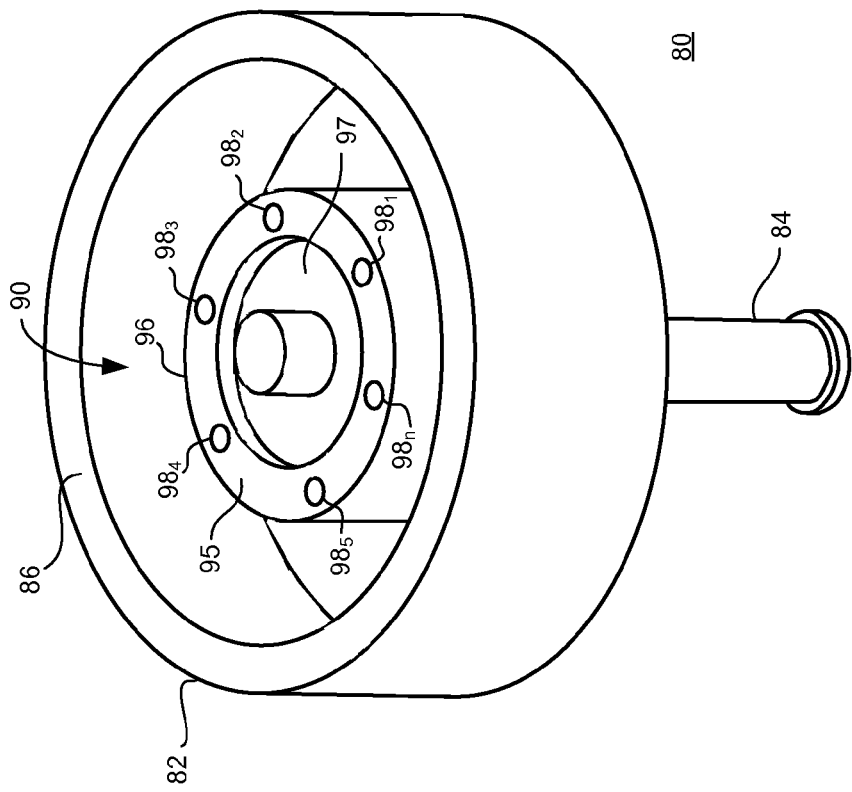
FIG. 4 is a perspective view of a second side of the flywheel fixture illustrated in FIG. 3.
Figure 3:
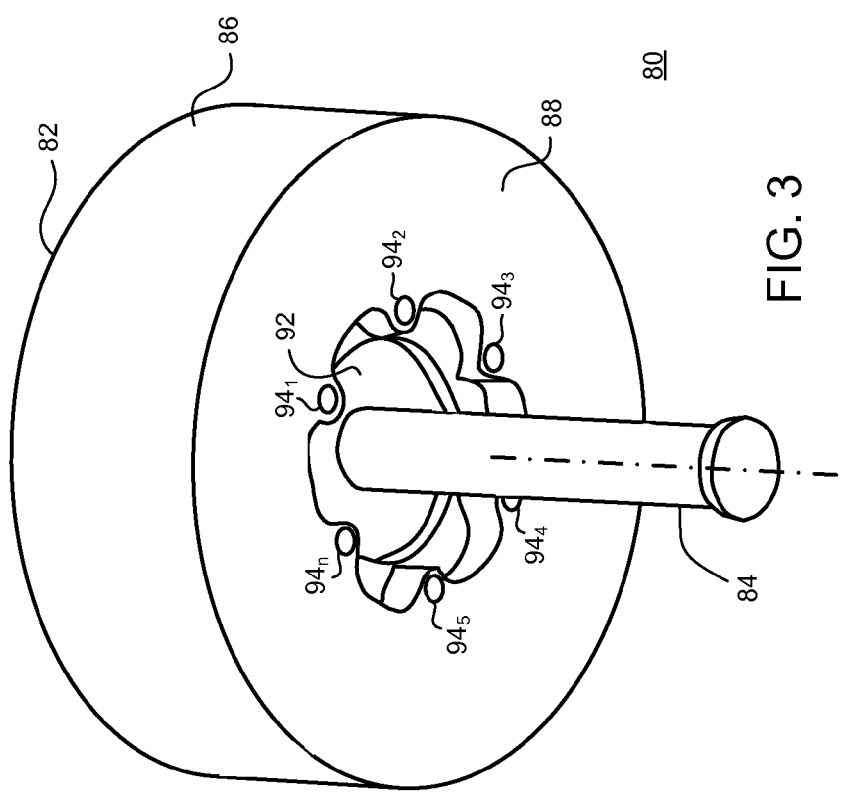
FIG. 3 is a perspective view of a first side of a flywheel fixture appropriate for employment with the apparatus of the present disclosure.

FIG. 3 is a perspective view of a first side of a flywheel fixture appropriate for employment with the apparatus of the present disclosure. FIG. 4 is a perspective view of a second side of the flywheel fixture illustrated in FIG. 3. Regarding FIG. 3 and FIG. 4 together, a flywheel fixture 80 may include a flywheel unit 82 having a generally cylindrical shape presenting a continuous wall 86 and an attached base portion 88 defining a well 90. Base portion 88 may present an opening 92 through which a flywheel shaft 84 may be received. Opening 92 may be substantially surrounded by a plurality of first apertures $94_1$, $94_2$, $94_3$, $94_4$, $94_5$, $94_n$. The indicator "n" is employed to signify that there can be any number of first apertures in base portion 88. The inclusion of six first apertures $94_1$, $94_2$, $94_3$, $94_4$, $94_5$, $94_n$ in FIG. 3 is illustrative only and does not constitute any limitation regarding the number of first apertures that may be included in the base portion of the present disclosure.

A flywheel mounting unit 96 may be oriented in an installed position with a plurality of second apertures $98_1$, $98_2$, $98_3$, $98_4$, $98_5$, $98_n$. The indicator "n" is employed to signify that there can be any number of second apertures in flywheel mounting unit 96. The inclusion of six second apertures $98_1$, $98_2$, $98_3$, $98_4$, $98_5$, $98_n$ in FIG. 4 is illustrative only and does not constitute any limitation regarding the number of second apertures that may be included in the flywheel mounting unit of the present disclosure.

Second apertures $98_1$, $98_2$, $98_3$, $98_4$, $98_5$, $98_n$ may be substantially in register with first apertures $94_1$, $94_2$, $94_3$, $94_4$, $94_5$, $94_n$ to facilitate mounting flywheel mounting unit 96 in a substantially fixed relation with flywheel unit 82 using fasteners in first apertures $94_1$, $94_2$, $94_3$, $94_4$, $94_5$, $94_n$ and second apertures $98_1$, $98_2$, $98_3$, $98_4$, $98_5$, $98_n$, such as threaded fasteners (not shown in detail in FIGS. 3 and 4; understood by those skilled in the art of mechanical assembly of parts). Another arrangement may involve employing first threaded fasteners traversing first apertures $94_1$, $94_2$, $94_3$, $94_4$, $94_5$, $94_n$ to affix flywheel unit 82 with flywheel mounting unit 96, and using second threaded fasteners traversing second apertures $98_1$, $98_2$, $98_3$, $98_4$, $98_5$, $98_n$ to mount a flywheel insert 102 (see FIG. 5) with flywheel mounting unit 96. In this other arrangement, first apertures $94_1$, $94_2$, $94_3$, $94_4$, $94_5$, $94_n$ and second apertures $98_1$, $98_2$, $98_3$, $98_4$, $98_5$, $98_n$ need not be equal in number or aligned. Flywheel shaft 84 may be fixedly mounted with flywheel mounting unit 96 in any manner known in the art including integrally forming flywheel shaft 84 with a plate 97, shrink fitting flywheel shaft 84 with plate 97 or press fitting flywheel shaft 84 with plate 97. Plate 97 may be integrally formed with flywheel mounting unit 96 or may be provided with apertures in register with first apertures $94_1$, $94_2$, $94_3$, $94_4$, $94_5$, $94_n$ and second apertures $98_1$, $98_2$, $98_3$, $98_4$, $98_5$, $98_n$ for traversing by fasteners when assembling flywheel mounting unit 96 with flywheel unit 82. If plate 97 is integrally formed with flywheel mounting unit 96, plate 97 may present a depressed well configuration generally as illustrated in FIG. 5, or may be substantially flush with the top surface 95 of flywheel mounting unit 96.

Figure 5:
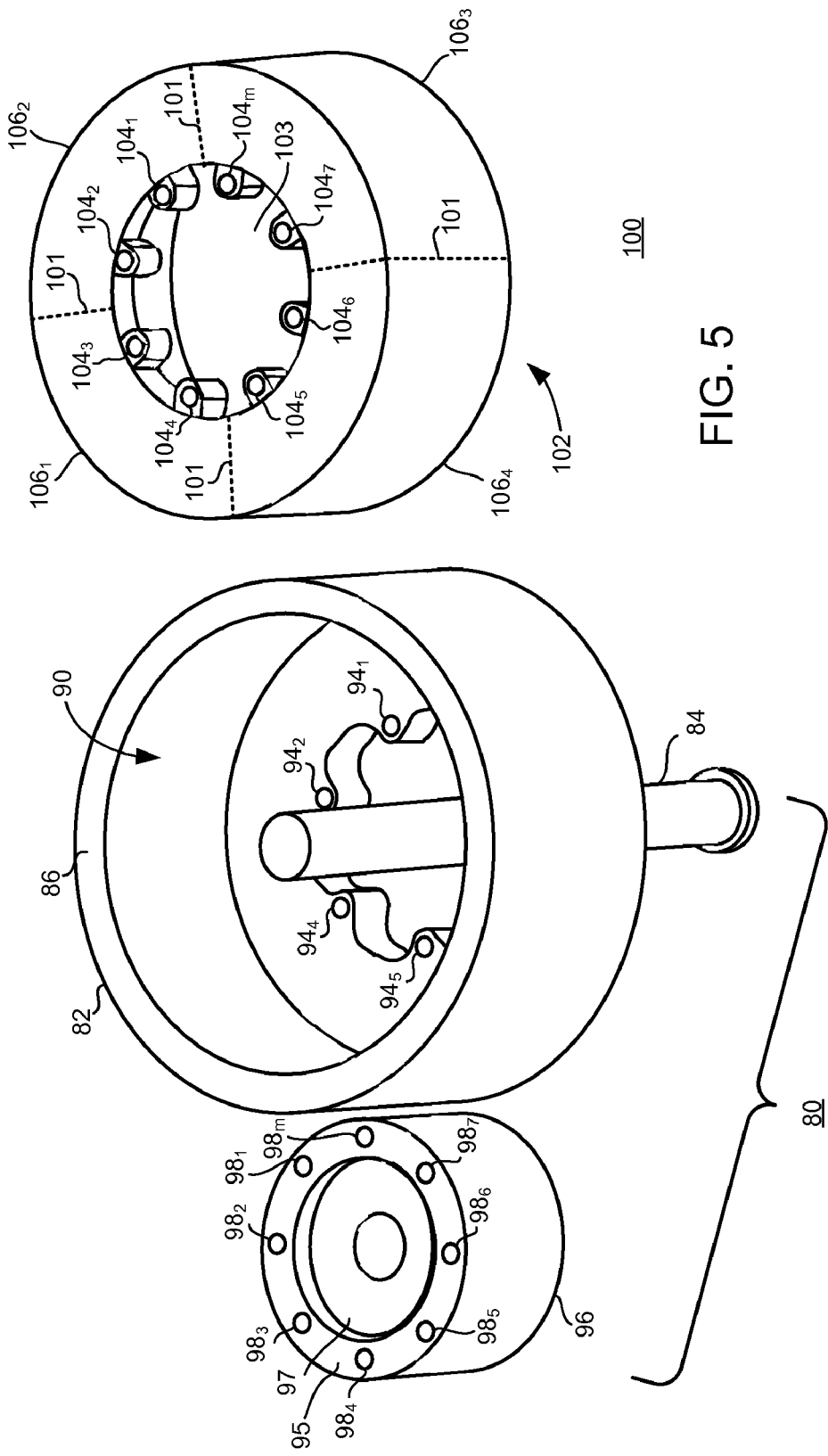
FIG. 5 is a perspective view of components of a flywheel assembly appropriate for employment with the apparatus of the present disclosure in a disassembled arrangement.

FIG. 5 is a perspective view of components of a flywheel assembly appropriate for employment with the apparatus of the present disclosure in a disassembled arrangement. In FIG. 5, a flywheel assembly 100 may include a flywheel fixture 80 substantially as described in connection with FIGS. 3 and 4 above. In order to avoid prolixity, that description will not be repeated here. A difference: eight first apertures $94_1$, $94_2$, $94_3$, $94_4$, $94_5$, $94_6$, $94_7$, $94_m$ (only first apertures $94_1$, $94_2$, $94_4$, $94_5$ are visible in FIG. 5) and eight second apertures $98_1$, $98_2$, $98_3$, $98_4$, $98_5$, $98_6$, $98_7$, $98_m$ are provided in the embodiment of flywheel fixture 80 illustrated in FIG. 5. Flywheel assembly 100 also may include a flywheel insert 102 having an opening 103. Opening 103 may be substantially surrounded by a plurality of securing apertures $104_1$, $104_2$, $104_3$, $104_4$, $104_5$, $104_6$, $104_7$, $104_m$. The indicator "m" is employed to signify that there can be any number of securing apertures in flywheel insert 102. The inclusion of eight securing apertures $104_1$, $104_2$, $104_3$, $104_4$, $104_5$, $104_6$, $104_7$, $104_m$ in FIG. 5 is illustrative only and does not constitute any limitation regarding the number of securing apertures that may be included in the flywheel insert of the present disclosure.

When assembled, flywheel assembly 100 presents flywheel fixture 80 substantially as illustrated in FIG. 4 with flywheel mounting unit 96 fastened within well 90 of flywheel unit 82. Flywheel insert 102 may be positioned within well 90 in surrounding relation with respect to flywheel mounting unit 96. Securing apertures $104_1$, $104_2$, $104_3$, $104_4$, $104_5$, $104_6$, $104_7$, $104_m$ may extend from flywheel insert 102 to partially overlay flywheel mounting unit 96 so that securing apertures $104_1$, $104_2$, $104_3$, $104_4$, $104_5$, $104_6$, $104_7$, $104_m$ may substantially align with first apertures $94_1$, $94_2$, $94_3$, $94_4$, $94_5$, $94_6$, $94_7$, $94_m$ (not all of first apertures $94_m$ are visible in FIG. 5) and second apertures $98_1$, $98_2$, $98_3$, $98_4$, $98_5$, $98_6$, $98_7$, $98_m$ to facilitate mounting flywheel insert 102 using common fasteners within first apertures $94_1$, $94_2$, $94_3$, $94_4$, $94_5$, $94_6$, $94_7$, $94_m$; second apertures $98_1$, $98_2$, $98_3$, $98_4$, $98_5$, $98_6$, $98_7$, $98_m$ and securing apertures $104_1$, $104_2$, $104_3$, $104_4$, $104_5$, $104_6$, $104_7$, $104_m$.

Flywheel insert 102 may be segmented as indicated by dotted lines 101 to present segments $106_1$, $106_2$, $106_3$, $106_4$ so as to facilitate insertion of flywheel insert 102 within well 90.

Flywheel assembly 100 may include flywheel fixture 80 with segmented flywheel insert 102. Flywheel assembly 100 may be substituted for flywheel 26 (FIG. 1). If more inertia is needed for flywheel 26 (e.g., if process parameters change such as, by way of example and not by way of limitation, workpiece 14 becomes thicker or is a different material), segmented inserts $106_1$, $106_2$, $106_3$, $106_4$ may be configured in a sufficiently small embodiment to be installed in flywheel assembly 100 without removing flywheel assembly 100 from apparatus 10 (FIG. 1). Inserting segmented inserts $106_1$, $106_2$, $106_3$, $106_4$, rather than changing to a different flywheel assembly 100 may save time in avoiding disassembly of apparatus 10 to alter moment of inertia of flywheel assembly 100 Inserting segmented inserts $106_1$, $106_2$, $106_3$, $106_4$, rather than changing to a different flywheel assembly 100 may also save wear and tear on bearings supporting process shaft 20 and flywheel shaft 40 (FIG. 2) because shafts 20, 40 may not need removal and reinsertion to effect replacement of flywheel assembly 100. Balancing of flywheel assembly 100 may also be more easily be carried out using segmented inserts $106_1$, $106_2$, $106_3$, $106_4$.

Adding the ability to change the flywheel moment of inertia provides a much wider operating range of energy input to the process than can be accompanied by regulating the initial flywheel rotational speed (set by the air pressure to the motor) alone. It also adds an additional process parameter (speed and energy are now semi-independent parameters). One may have an inventory of various segmented inserts $106_1$, $106_2$, $106_3$, $106_4$, in which the radial thickness of respective sets of segmented inserts $106_1$, $106_2$, $106_3$, $106_4$, may vary from one set of inserts to the next. In this way, well 90 may be filled to varying amounts ranging from nearly empty to nearly full to present varied moments of inertia for flywheel assembly 100.

Figure 6:
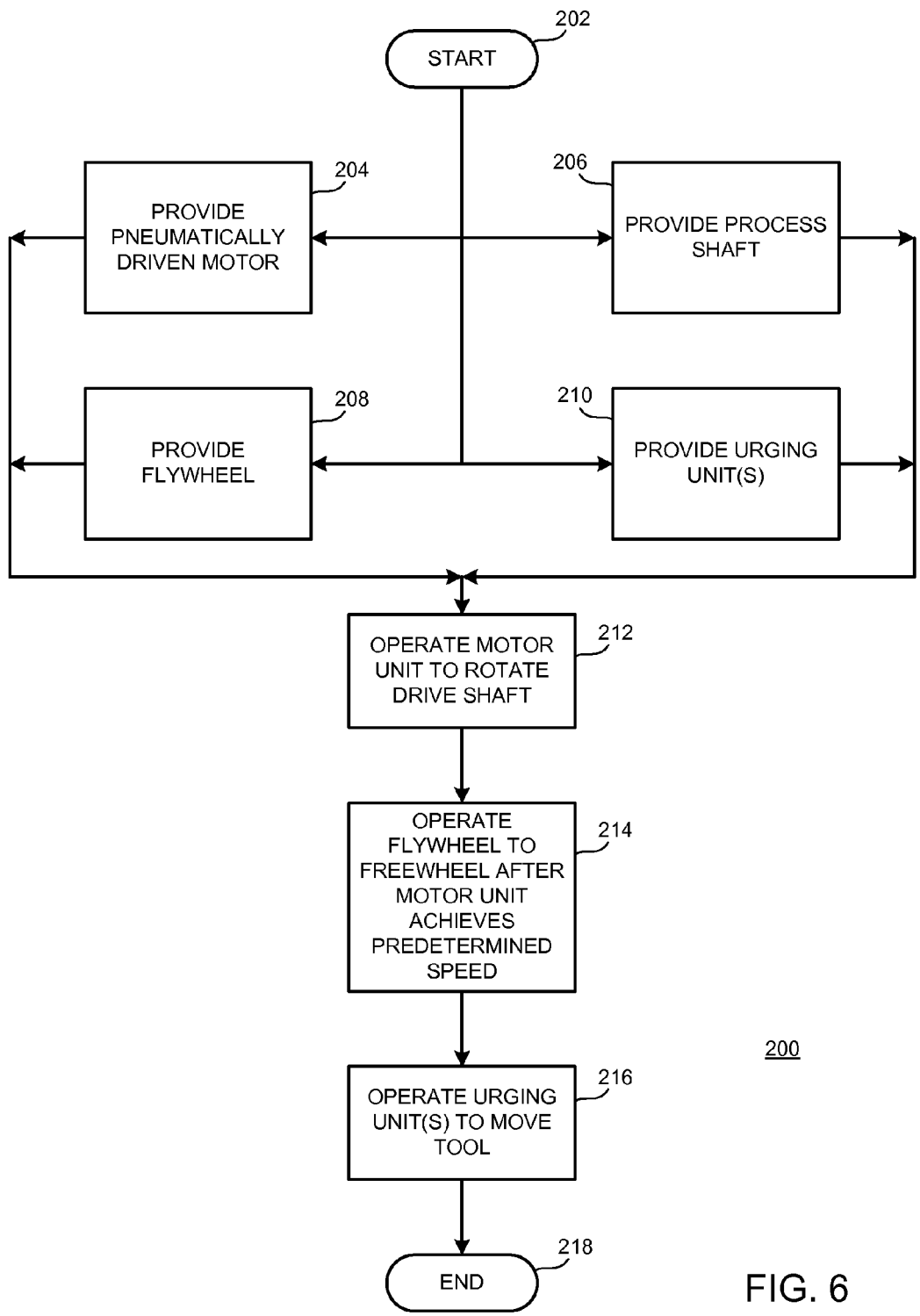
FIG. 6 is a flow chart illustrating the method of the present disclosure.

FIG. 6 is a flow chart illustrating the method of the present disclosure. In FIG. 6, a method 200 for bearing a tool against a workpiece may begin at a START locus 202. Method 200 may continue with, in no particular order: (1) providing a pneumatically driven motor unit presenting a drive shaft, as indicated by a block 204; (2) providing a process shaft coupled with the drive shaft and coupled with the tool, as indicated by a block 206; (3) providing a flywheel coupled with one shaft of the drive shaft and the process shaft, as indicated by a block 208; and (4) providing at least one urging unit coupled with at least one of the motor unit and the process shaft, as indicated by a block 210.

Method 200 may continue with operating the motor unit to rotate the drive shaft substantially about a longitudinal axis, as indicated by a block 212.

Method 200 may continue with operating the flywheel and the one shaft to impart inertial rotational energy to the tool after the pneumatic motor achieves a predetermined rotational speed, as indicated by a block 214.

Method 200 may continue with operating the at least one urging unit to effect moving the tool with respect to the workpiece, as indicated by a block 216.

Method 200 may terminate at an END locus 218.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following

We claim:

1. An apparatus for applying axial pressure to a workpiece; the apparatus comprising:
    (a) a base unit and a welding tool affixed with a rotating process shaft;
    (b) a pneumatic motor coupled with said base unit and with a drive shaft; said pneumatic motor imparting a rotating motion to said drive shaft about a first longitudinal axis; said drive shaft being coupled for imparting a rotating motion to said process shaft about a second longitudinal axis; said first longitudinal axis and said second longitudinal axis being substantially parallel;
    (c) a flywheel unit coupled with at least one shaft of said drive shaft and said process shaft; said flywheel unit including a flywheel fixture coupled with said at least one shaft; said flywheel fixture presenting a well structure containing a flywheel insert element installed in surrounding relation about a flywheel mounting unit and secured through apertures extending from said flywheel insert element; and
    (d) at least one urging unit coupled with said base unit; said urging unit moving said welding tool toward and away from said workpiece along a path generally parallel with said second longitudinal axis; said axial pressure being applied by said urging unit moving said tool against said workpiece.

2. An apparatus for applying axial pressure to a workpiece as recited in claim 1 wherein said drive shaft and said process shaft are substantially coaxial.

3. An apparatus for applying axial pressure to a workpiece as recited in claim 1 wherein said drive shaft and said process shaft are magnetically coupled.

4. An apparatus for applying axial pressure to a workpiece as recited in claim 1 wherein said drive shaft and said process shaft are a single unitary shaft.

5. An apparatus for applying axial pressure to a workpiece as recited in claim 1 wherein said flywheel insert element is a replaceable flywheel insert element; a first said replaceable flywheel insert element effecting a first moment of inertia when installed within said well structure; a different replaceable flywheel insert element than said first replaceable flywheel insert element effecting a different moment of inertia than said first moment of inertia when said different replaceable flywheel insert element is installed in said well structure.

6. An apparatus for applying axial pressure to a workpiece as recited in claim 1 wherein said flywheel insert element is a segmented insert comprising a plurality of flywheel sections separated along planes substantially containing one of said first longitudinal axis and said second longitudinal axis.

7. An apparatus for applying axial pressure to a workpiece as recited in claim 3 wherein said flywheel unit is coupled with said process shaft, and wherein said flywheel and drive shaft impart inertial rotational energy to said tool after said pneumatic motor achieves a predetermined rotational speed.

8. An apparatus for applying axial pressure to a workpiece as recited in claim 4 wherein said flywheel unit is coupled with said drive shaft, and wherein said flywheel and drive shaft impart inertial rotational energy to said tool after said pneumatic motor achieves a predetermined rotational speed.

9. An apparatus for effecting a plug welding process with a workpiece; the apparatus comprising:
    (a) a pneumatically driven motor unit rotating a drive shaft substantially about a longitudinal drive axis;

(b) a plug welding tool and a process shaft coupled with said drive shaft for rotating said plug welding tool substantially about a longitudinal process axis;

(c) a flywheel unit coupled with one shaft of said drive shaft and said process shaft; said flywheel unit including a flywheel fixture coupled with said at least one shaft; said flywheel fixture presenting a well structure containing a flywheel insert element installed in surrounding relation about a flywheel mounting unit and secured through apertures extending from said flywheel insert element; and (d) at least one urging unit coupled with at least one of said motor unit and said process shaft; said urging unit moving said plug welding tool with respect to said workpiece; said flywheel and drive shaft imparting inertial rotational energy to said plug welding tool after said pneumatic motor achieves a predetermined rotational speed.

10. An apparatus for effecting a plug welding process with a workpiece as recited in claim 9 wherein said urging unit moves said plug welding tool to apply said inertial rotational energy against said workpiece at a welding site to effect said plug welding process.

11. An apparatus for effecting a plug welding process with a workpiece as recited in claim 9 wherein said flywheel insert element is a segmented insert comprising a plurality of flywheel sections separated along planes substantially containing one of said longitudinal drive axis and said longitudinal process axis.

12. An apparatus for effecting a plug welding process with a workpiece as recited in claim 9 wherein said drive shaft and said process shaft are substantially coaxial.

13. An apparatus for effecting a plug welding process with a workpiece as recited in claim 9 wherein said flywheel is enclosed in an evacuated chamber.

14. An apparatus for effecting a plug welding process with a workpiece as recited in claim 10 wherein said flywheel is enclosed in an evacuated chamber.

15. An apparatus for effecting a plug welding process with a workpiece as recited in claim 11 wherein said flywheel is enclosed in an evacuated chamber.

16. An apparatus for effecting a plug welding process with a workpiece as recited in claim 12 wherein said flywheel is enclosed in an evacuated chamber.

17. An apparatus for effecting a plug welding process with a workpiece as recited in claim 9 wherein said flywheel insert element is a replaceable flywheel insert element; a first said replaceable flywheel insert element effecting a first moment of inertia when installed within said well structure; a different replaceable flywheel insert element than said first replaceable flywheel insert element effecting a different moment of inertia than said first moment of inertia when said different replaceable flywheel insert element is installed in said well.

* * * * *